United States Patent [19]

Eickmeyer

[11] 4,430,312

[45] Feb. 7, 1984

[54] REMOVAL OF $CO_2$ FROM GAS MIXTURES

[76] Inventor: Allen G. Eickmeyer, 8126 El Monte, Prairie Village, Kans. 66208

[21] Appl. No.: 391,303

[22] Filed: Jun. 23, 1982

[51] Int. Cl.$^3$ .............................................. B01D 53/34
[52] U.S. Cl. .................... 423/223; 423/232; 252/192
[58] Field of Search ............ 423/223, 232, 233; 252/192

[56] References Cited

U.S. PATENT DOCUMENTS

| | | | |
|---|---|---|---|
| 2,886,405 | 5/1959 | Benson et al. | 423/223 |
| 3,851,041 | 11/1974 | Eickmeyer | 423/223 |
| 3,896,212 | 7/1975 | Eickmeyer | 423/223 |
| 3,907,969 | 9/1975 | Field | 423/223 |
| 3,932,582 | 1/1976 | Eickmeyer | 423/223 |
| 3,951,844 | 4/1976 | Mago | 423/232 X |
| 4,271,132 | 6/1981 | Eickmeyer | 423/223 |

*Primary Examiner*—Earl C. Thomas
*Attorney, Agent, or Firm*—Schmidt, Johnson, Hovey & Williams

[57] ABSTRACT

An improved, catalyzed process for the removal of $CO_2$ from gas mixtures is described using a solution containing 15–40% by weight of potassium carbonate in which the absorption efficiency is enhanced by the addition of sodium or potassium vanadate equivalent to 2 to 10% by weight of $V_2O_5$ and sodium or potassium borate equivalent to 1 to 10% by weight of $KBO_2$ in which the weight ratio of equivalent $KBO_2$ to equivalent $V_2O_5$ is less than 1.5:1. It has been found that use of the described catalysts permits significant reductions in solution circulation rates (up to 45%), which leads to equipment and utility economies.

9 Claims, No Drawings

REMOVAL OF CO2 FROM GAS MIXTURES

This invention relates to a process for the removal of $CO_2$ from gas mixtures by means of aqueous solutions of potassium carbonate containing potassium vanadate and borate additives in a defined ratio and with concomitant reductions in scrubbing solution flow rates.

The removal of $CO_2$ from gas mixtures with aqueous potassium carbonate solutions is well known. The absorption is generally done with a hot solution as described in U.S. Pat. No. 2,886,405. The efficiency of the process is greatly enhanced by the use of amine and especially by amine borate additives described in U.S. Pat. Nos. 4,271,132 and 3,851,041 of A. G. Eickmeyer.

However, such organic additives are subject to oxidative degradation when scrubbing gases containing oxygen, especially at elevated temperatures. This causes the solution to lose absorption efficiency and to accumulate undesirable oxidation products. For the same reasons such solutions cannot be regenerated by means of air stripping.

In addition, the equipment and utility costs associated with $CO_2$ removal plants are considerable; therefore, workers in the art are continuously searching for ways to lower such costs. One possibility is to lower the circulation rate of the scrubbing solution, which saves money on equipment (e.g., smaller pumps and towers) and also on steam in the regeneration section. Obviously, however, such cost saving measures can be effected only if the scrubbing solution, at design concentrations and temperatures, is capable of handling the gas removal load at the lowered circulation rates.

Gas mixtures for which the present invention is well suited include recycle gas in the production of ethylene oxide from ethylene and oxygen, flue gas and lime kiln gas.

U.S. Pat. No. 3,907,969 of Joseph H. Field discloses aqueous solutions of potassium carbonate containing $KBO_2$ and $V_2O_5$ in which the weight ratio of equivalent $KBO_2$ to equivalent $V_2O_5$ is at least 1.5:1. The tests described in this patent indicate that the $CO_2$ absorption rate is improved by the addition of both $KBO_2$ and $V_2O_5$ but that the $CO_2$ pickup of the solution is increased by the $KBO_2$ and decreased by the $V_2O_5$. Therefore the weight ratio of $KBO_2$ to $V_2O_5$ is specified to be at least 1.5:1. Indeed, in Table IV of this patent results are set forth which demonstrate that, at $KBO_2$/$V_2O_5$ ratios of less that 1.5:1 $CO_2$ pickup is decreased as compared with the control.

Surprisingly, it has been discovered that both the absorption rate and the $CO_2$ pickup are increased by increasing additions of $V_2O_5$ to potassium carbonate solution and that it is actually preferable to have a weight ratio of $KBO_2$ to $V_2O_5$ of less than 1.5:1. Further, the systems of the invention can be advantageously operated at circulation rates significantly below the rates employed with a comparable (i.e., the same $K_2CO_2$ concentration and temperature (non-catalyzed hot potassium carbonate solution, when scrubbing identical gas streams. Such reduction can be up to 45%, and preferably from about 30 to 40%.

The scrubbing solutions hereof use $K_2CO_3$ as the principal salt in concentrations from 15% to 40% by weight and preferably from 20% to 30% by weight. The solutions are usually cycled between an absorption stage, where $CO_2$ is picked up by the solution from the gas, and a regeneration stage, where $CO_2$ is desorbed from the solution by steam or air stripping. The absorption is preferably conducted at superatmospheric pressure and the regeneration is preferably at near atmospheric pressure. The absorption temperature may be substantially the same as the regeneration temperature. In some cases a small amount of cooled solution may be sent to the top of the absorber in order to remove $CO_2$ down to a low level.

Some $CO_2$ remains dissolved even in the regenerated solution, where it is present at $KHCO_3$. Thus a regenerated solution of 25% equivalent $K_2CO_3$ with 30% of the $K_2CO_3$ converted to $KHCO_3$ would have 17.5% $K_2CO_3$ and 10.85% $KHCO_3$ by weight.

Sodium or potassium vanadate is added to the solutions in an amount from 2% to 10% by weight of equivalent $V_2O_5$. The preferred concentration is from 3% to 8% by weight equivalent $V_2O_5$. The vanadate may be added as the sodium, potassium or ammonium meta vanadate or it may be formed in place by dissolving $V_2O_5$ in the $K_2CO_3$ solution as follows:

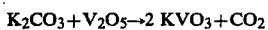

$$K_2CO_3 + V_2O_5 \rightarrow 2\ KVO_3 + CO_2$$

Also it may be added as sodium or potassium pyrovanadate, $Na_4V_2O_7$ or $K_4V_2O_7$, or it may be preformed by reacting $V_2O_5$ with KOH solution.

Taking into account the equivalent weights, the addition of 1.52% by weight of $KVO_3$ or 1.34% $NaVO_3$ gives 1% by weight of equivalent $V_2O_5$.

The effective amount of sodium or potassium borate in the scrubbing solutions of the invention is in the range of from 1% to 10% by weight of equivalent $KBO_2$ and the preferred range is from 2% to 8% by weight of equivalent $KBO_2$. The borate may be added as sodium or potassium metaborate, $Na_2B_2O_4$ or $K_2B_2O_4$, or sodium or potassium tetraborate, $Na_2B_4O_7$, or $K_2B_4O_7\cdot 8H_2O$, or as other borate salts. Also it can be formed by adding boric acid to potassium carbonate solution as follows:

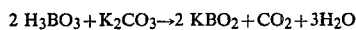

$$2\ H_3BO_3 + K_2CO_3 \rightarrow 2\ KBO_2 + CO_2 + 3H_2O$$

In this case the addition of 0.755% by weight of $H_3BO_3$ gives 1% by weight of equivalent $KBO_2$.

In typical systems of the invention, the temperature of the absorption solution is maintained within the range of 180°–250° F.; typical pressures within the absorption stage range from 200–500 psig.

EXAMPLES

The relative rates of $CO_2$ absorption and the relative pickup of $CO_2$ was measured at 80° C. using 25% by weight of aqueous $K_2CO_3$ solution without and with various amounts of $V_2O_5$ and boric acid added to give the specified percentages of $V_2O_5$ and equivalent $KBO_2$ shown on Table I. Percentage reductions in circulation rate when using the compositions of the invention as compared with a non-catalyzed control were also determined.

TABLE 1

| Run | $K_2CO_3$ | $V_2O_5$ | $KBO_2$ | RATE | $CO_2$ PICKUP | CALCULATED PERCENTAGE REDUCTION IN CIRCULATION RATE |
|-----|-----------|----------|---------|------|---------------|------------------------------------------------------|
| A   | 25        | 0        | 0       | 1.00 | 1.00          | —                                                    |
| B   | 25        | 2        | 4       | 2.91 | 1.45          | 31%                                                  |
| C   | 25        | 4        | 2       | 3.79 | 1.54          | 35%                                                  |
| D   | 25        | 8        | 2       | 6.21 | 1.71          | 42.5%                                                |
| E   | 25        | 8        | 8       | 5.21 | 1.63          | 38.7%                                                |

The relative rate of $CO_2$ absorption was determined by comparing the pseudo first order absorption rate, that is the natural logarithm of the ratio of the $CO_2$ entering to the $CO_2$ leaving, for solutions having the same equilibrium back pressure. The increased $CO_2$ pickup of the more active solutions is believed to result from better regeneration of the lean solution and a closer approach to equilibrium for the rich solution, thus giving a higher solution conversion range or "pickup."

Comparing runs B and C shows that a 2:1 ratio of $V_2O_5$ to $KBO_2$ (run C) rather than a 2:1 ratio of $KBO_2$ to $V_2O_5$ (run B) gives an appreciable increase in the relative absorption rate as well as the $CO_2$ pickup. Comparing runs C and D shows that doubling the $V_2O_5$ content, while holding the $KBO_2$ the same, enhances the solution effectiveness appreciably. Comparison of runs D and E shows that increasing the $KBO_2$ with the same $V_2O_5$ decreases the solution effectiveness somewhat. Also, as set forth in the righthand column, the solutions permit very significant reductions in circulation rates and therefore give the attendant advantages noted above.

Since the solutions hereof are not subject to oxidative degradation they are well suited to removal of $CO_2$ from gases also containing oxygen, such as ethylene oxide recycle gas, flue gas and lime kiln gas. For the same reason it is practical to regenerate the solutions by means of air stripping or a combination of air and steam stripping.

I claim:

1. In a method for absorbing $CO_2$ from a gas mixture containing the same wherein a hot absorption solution having from 15 to 40% by weight of potassium carbonate is continuously circulated at a circulation rate through an absorption stage and a regeneration stage, said gas mixture is contacted with said solution in said absorption stage to absorb $CO_2$ from the mixture, and said solution is thereafter regenerated in said regeneration stage by removal of $CO_2$ therefrom, the improvement which comprises the steps of:
    adding to said solution from about 2 to 10% by weight equivalent $V_2O_5$ and from about 1 to 10% by weight of equivalent $KBO_2$, the weight ratio of equivalent $KBO_2$ to equivalent $V_2O_5$ being less than 1.5:1; and
    reducing said circulation rate by an amount of up to about 45%.

2. The method of claim 1, said circulation rate being reduced by an amount of about 30 to 40%.

3. The method of claim 1 wherein the concentration of equivalent $V_2O_5$ is from about 3 to 8% by weight, and the concentration of equivalent $KBO_2$ is from about 2 to 8% by weight.

4. The method of claim 1 wherein the weight ratio of equivalent $KBO_2$ to equivalent $V_2O_5$ is less than 1:1.

5. The method of claim 1 wherein the concentration of potassium carbonate in said solution is from about 20 to 30% by weight.

6. The method of claim 1, said absorption being carried out at superatmospheric pressures.

7. The method of claim 1, said regeneration including the steps of steam stripping said solution.

8. The method of claim 1, the temperature of said solution during said absorption step being approximately the same as the temperature thereof during said regeneration step.

9. The method of claim 1, said solution being at a temperature of from about 180° to 250° F.

* * * * *